Aug. 2, 1927.
O. G. SCHMITT
1,637,624
CORN PLASTER MACHINE
Filed July 13, 1925
3 Sheets-Sheet 1
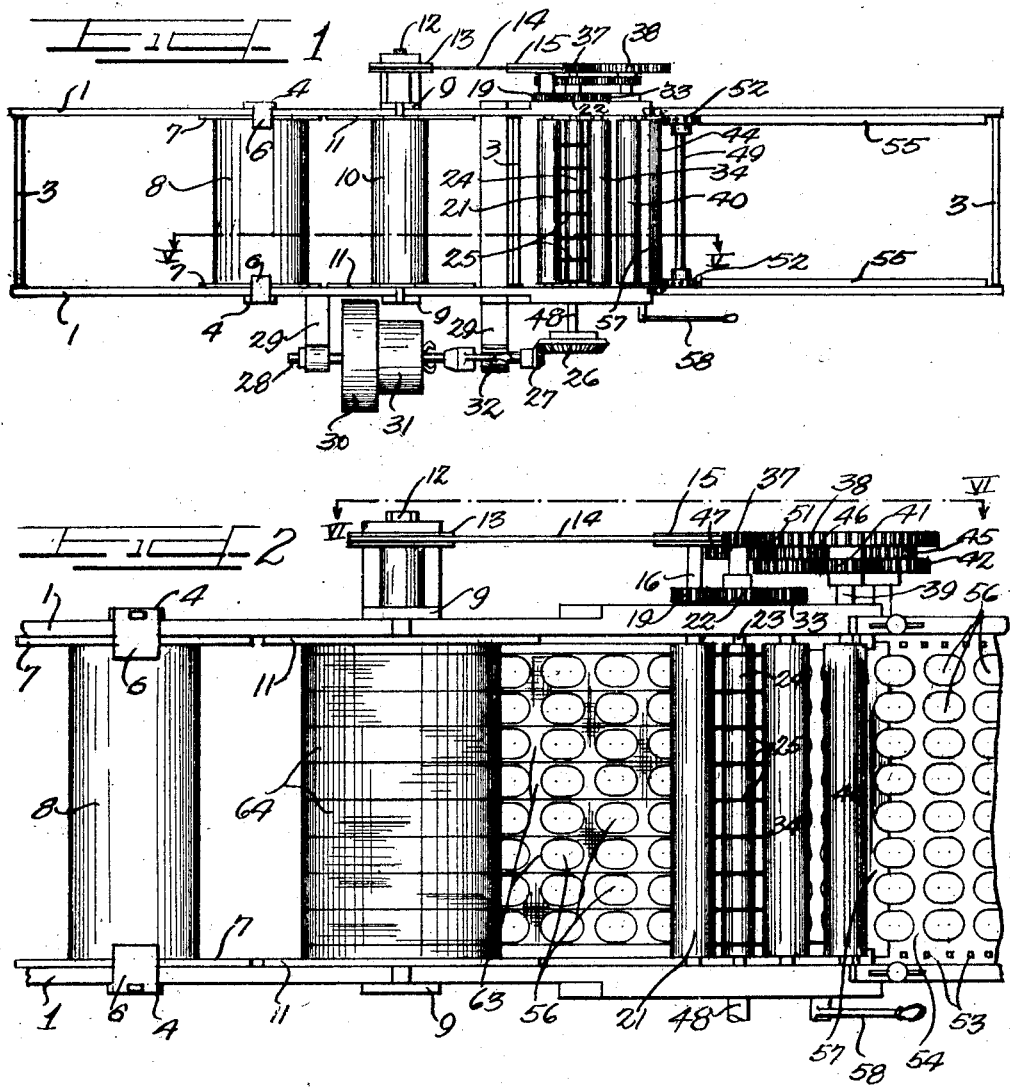
INVENTOR
Otto G. Schmitt
By Charles ........
ATT'YS

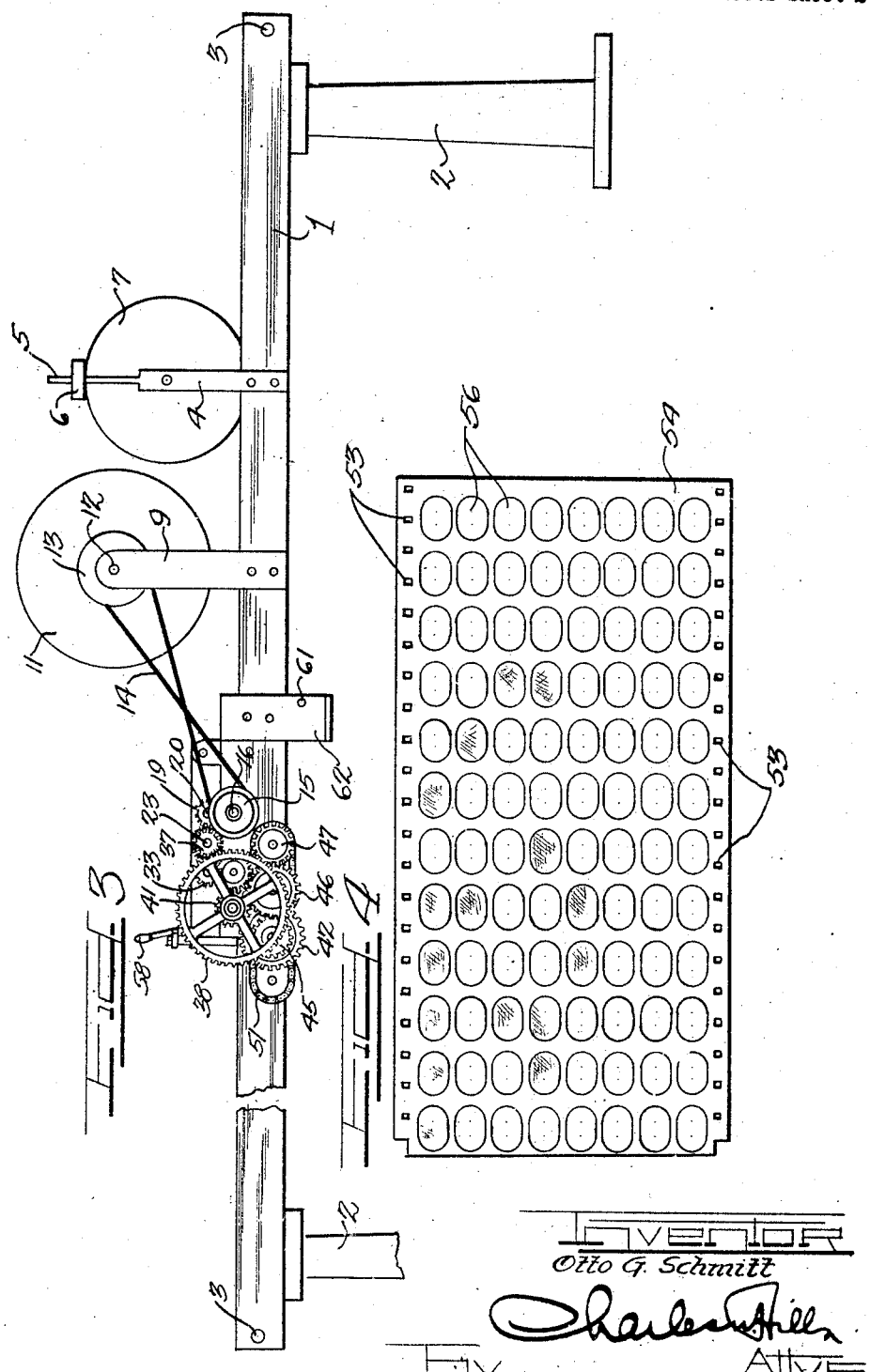

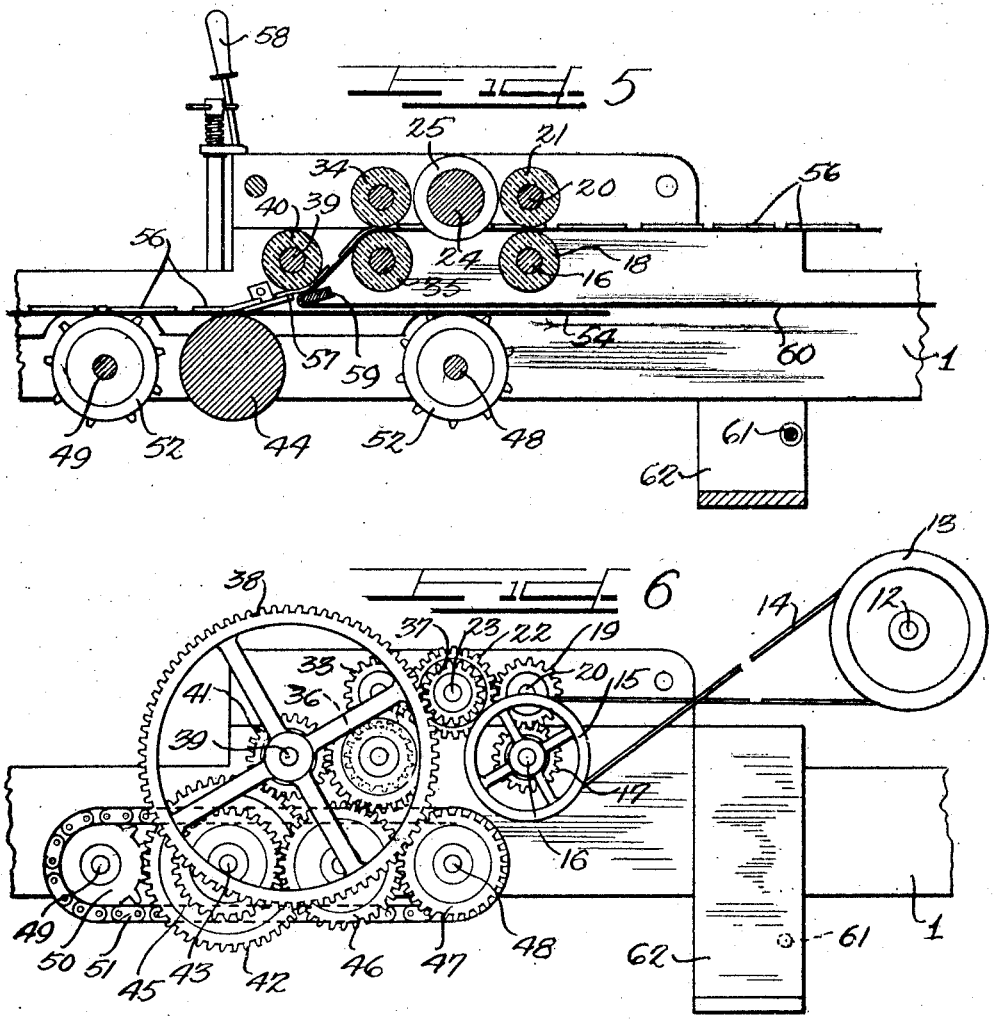

Patented Aug. 2, 1927.

1,637,624

UNITED STATES PATENT OFFICE.

OTTO G. SCHMITT, OF CHICAGO, ILLINOIS, ASSIGNOR TO THE SCHOLL MFG. CO., INC., OF CHICAGO, ILLINOIS, A CORPORATION OF NEW YORK.

CORN-PLASTER MACHINE.

Application filed July 13, 1925. Serial No. 43,424.

In the manufacture of corn plasters, preliminary to placing the finished corn plasters on strips of gauze, the corn plasters are automatically deposited upon plates. These plates, with the corn plasters properly arranged thereon, are stacked one upon the other ready to have the corn plasters automatically removed therefrom and deposited upon a long sheet of gauze after which the sheet of gauze is automatically cut in strips and the strips wound in rolls ready to be placed in boxes or cartons for shipping.

This invention relates to a corn plaster stripping machine adapted to automatically remove corn plasters from plates and deposit said corn plasters on a continuous sheet of gauze after which the sheet is cut into strips and the strips simultaneously wound on a drum to afford a plurality of adjacently disposed rolls of corn plasters.

It is also an object of this invention to provide a machine for automatically transferring corn plasters from plates to strips of gauze.

Another important object of the invention is to provide a machine adapted to automatically transfer corn plasters from plates onto a strip of gauze which is slit or cut to afford a plurality of strips of gauze all of which are simultaneously wound to afford a plurality of rolls of corn plasters.

It is a further object of this invention to provide a machine having means for removing corn plasters from plates and then depositing said corn plasters on a strip of gauze in proper spaced relation after which the corn plasters are pressed into contact with the gauze as the gauze is being cut into strips prior to the winding of said strips to form rolls of corn plasters.

It is an important object of this invention to provide an improved machine to automatically handle corn plasters by removing the same from plates and then automatically depositing the same in proper spaced relation in rows upon a strip of gauze, which, prior to the winding thereof, is slit to afford a plurality of rolls of corn plasters each having a single row deposited thereon.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of the corn plaster stripping machine embodying the principles of this invention.

Figure 2 is an enlarged fragmentary top plan view of the machine with parts omitted, showing a fragmentary portion of one of the corn plaster plates in position to permit the corn plasters to be removed and deposited on strips of gauze.

Figure 3 is a fragmentary side elevation of the machine.

Figure 4 is a plan view of one of the corn plaster plates.

Figure 5 is an enlarged longitudinal vertical section taken on line V—V of Figure 1 with parts omitted.

Figure 6 is a side elevation of the driving gear mechanism taken on line VI—VI of Figure 2.

As shown on the drawings:

The reference numeral 1 indicates the sills of a horizontal table or frame supported on legs or uprights 2. The frame sills 1 are connected by means of transverse brace rods 3. Rigidly secured to the frame sills 1 near one end of the machine are two upright brackets 4, the upper ends of which are reduced in size to afford rods 5 upon which drag weights 6 are slidably disposed. The drag weights 6 are adapted to frictionally contact the peripheral surfaces of a pair of end disks 7 formed on the ends of a cylindrical drum on which a roll of gauze 8 is carried. The shaft of the gauze drum is supported on the brackets 4 thereby holding the gauze roll in position with the weights 6 contacting with the drum or reel disks 7.

Also secured to the frame sills 1 to the inside of the gauze reel brackets 4 are a pair of oppositely disposed arms or brackets 9 on which is rotatably supported a corn plaster pad reel or drum 10 having end disks 11 forming a part thereof. One end of the shaft 12 of the reel 10 has a grooved pulley wheel 13 secured thereon around which an endless belt 14 is trained. The endless belt 14 crosses itself and is also trained around a smaller drive pulley 15. The pulley wheel 15 is secured on one end of a lower shaft 16 on which a small gear 17 is also mounted adjacent the outer side of the machine frame. Mounted on the lower shaft 16 between the frame sills 1 is a lower rubber roll 18. The gear 17 meshes with an upper gear 19 mounted on one end of an upper roller shaft 20. An upper rubber roll 21 is mounted on the upper shaft 20. The gear 19 receives a drive and is in mesh with a gear 22 supported on one projecting end of a cutter roll shaft 23. Supported on the cutter roll shaft 23 between the frame sills 1 is a cutter drum 24 which carries a plurality of spaced circular blades or knives 25. One end of a transverse shaft 48 has a bevel gear 26 mounted thereon which is in mesh with a bevel pinion 27 mounted on one end of a horizontal shaft 28 journalled in brackets 29 fixed on the ouside of one of the frame sills 1. Secured on the shaft 28 is a pulley 30 around which a driving belt is adapted to be trained. The driving belt may be connected with any suitable source of power. Mounted on the shaft 28 adjacent the pulley 30 is a clutch mechanism 31 adapted to be controlled by means of a lever or handle 32 to govern the transmitting of the drive from the pulley 30 to the bevel gear 27.

Also meshing with the gear 22 is an upper gear 33 which is secured on one end of the shaft of an upper rubber roll 34 the shaft of which is journalled in the frame sills 1. Rotatably mounted in the machine frame below the upper rubber roller 34 is a lower rubber roller 35 on the shaft of which a lower gear 36 is secured with said gear 36 meshing with the upper gear 33 to drive the same.

Also secured on the extreme outer end of the cutter roll shaft 23 is a pinion 37 (Figure 6). The pinion 37 is in mesh with a large gear 38 which is mounted on one end of the shaft 39 of a primary rubber roller 40. Also mounted upon the roller shaft 39 to the inside of the large gear 38 is a gear 41. The gear 41 is in mesh with a gear 42 mounted on the shaft 43 of a steel guide roller 44. The shaft 43 is journalled in suitable bearings in the frame sills 1. Fastened to one side of the gear 42 is a gear 45. The gear 45 meshes with an intermediate gear 46 which in turn meshes with a gear 47 on one end of a transverse drive shaft 48 journalled in the frame sills 1. Also journalled in the frame sills 1 is a second shaft 49. Each of the shafts 48 and 49 has a sprocket 50 mounted thereon to the outside of one of said frame sills. An endless chain 51 is trained around the sprockets 50 and receives a drive from the shaft 48. Mounted on each of the shafts 48 and 49 adjacent the inner sides of each of the frame sills 1 are a pair of sprockets 52. The sprockets 52 are positioned to permit the teeth thereof to engage in the marginal openings 53 formed along the longitudinal margins of a corn plaster carrying plate 54 as illustrated in Figure 4. The inner sides of the frame sills 1 have plate guides 55 secured thereto on which the corn plaster plates 54 are adapted to slide as they are fed into the machine. Each of the plates 54 has disposed thereon, transverse rows of corn plasters or pads 56 the adhesived sides being in contact with the plate. As clearly illustrated in Figure 4 it will be seen that the corn plaster or pads 56 are arranged in rows both transversely and longitudinally of the plate.

The teeth of the sprockets 52 are adapted to engage in the plate openings 53 thereby causing the plate 54 to be fed into the machine over the steel guide roller 44 and beneath a transversely disposed pivotally mounted knife or stripping blade 57 (Figure 5). The pivoted stripping knife or blade 57 is controlled by means of a handle or lever 58 mounted on one side of the machine frame. Also mounted transversely of the machine frame directly below the rubber roller 40 is a transverse guide 59 around which the wide strip or band of gauze 60 is adapted to pass to permit the corn plasters or pads when removed from the plate 54 by the knife mechanism, to be transferred onto the gauze before the same passes between the two sets of rubber press rollers. As the corn plasters are stripped from the plate 54 said plate 54 is advanced over the second set of sprockets 52 and then out of the lower part of the machine over a discharge roller 61 mounted transversely below the machine frame on brackets 62.

The operation is as follows:

The corn plasters or pads 56 are manufactured by machine and deposited upon plates 54 in transverse and longitudinal rows as indicated in Figure 4. The above mentioned method of manufacturing corn plasters or pads is covered in my co-pending application for patent for a "method and machines for making corn plasters". Serial No. 43,423, filed on the 13th day of July, 1925.

The plates carrying the rows of corn plasters are delivered to the stripping machine of this invention and are successively placed upon the guide bars or rails 55 in a position to permit one end of said plates to have the apertures 53 thereof engage a set of the feed sprockets 52.

The operation of the machine is controlled by means of the lever 32 which governs the clutch 31 controlling the drive through the pulley 30. When the clutch is thrown in the shaft 28 is rotated, thereby causing the pinion 27 to rotate the bevel gear 26 and the drive shaft 48. A drive is thus transmitted to the drum 24 and the disk cutters or knives 25 supported thereon by the train of gears illustrated in Figure 6. The drive to the cutter drum is transmitted by means of the gear 22 to the gears 19 and 33 thereby causing rotation of the upper rubber rollers 21 and 34. The lower rollers 18 and 35 are driven from the upper rollers through the gears 17 and 36 meshing respectively with the gears 19 and 33. The gear 37 on the end of the cutter shaft 23 receives a drive from the large gear 38 on which the gear 41 is mounted. The gear 41 is driven from the gear 42 which in turn is driven by the gear 45 on the shaft 43. The gears 45 and 46 are driven by the drive gear 47 on shaft 48.

With the machine in operation as above described a plate of corn plasters is placed upon the guide rails 55 and pushed into engagement with the first set of sprockets 52. The plate is then advanced into the machine over the steel guide roller 44 (Figure 5) and beneath the stripper blade 57. The position of the stripper blade 57 is controlled by means of the control lever 58 which may be operated to tip the stripper blade downwardly into an inclined position to scrape over the upper surface of the plate 54 as it is advanced. With the stripper blade 57 lowered as described and with the plate 54 moving into the machine, the inclined stripper blade 57 acts to scrape or strip the transverse rows of corn plasters or pads 56 from the advancing plate. The drive from the machine is transmitted to the reel or roll 10 by means of an endless crossed belt 14.

A roll of gauze is engaged on the gauze reel 8 with the control weights 6 frictionally contacting the peripheral surfaces of the disks 7 of the gauze reel. The weights 6 control the unwinding of the roll of gauze. The gauze from the gauze roll is conducted into the machine and moves in a direction opposite to that of the movement of the plates 54 through the machine. From the reel 8 the gauze is conducted beneath the transverse guide bar 59 and then passes upwardly between said bar and primary roller 40. The gauze then passes between the first pair of pressing rollers 34—35, then into the field of operation of the knives 25 and then between the second set of rubber rollers 18 and 21. As the gauze is advanced over the transverse bar 59, a transverse row of corn plasters is removed from the plate 54 by means of the stripper blade 57. The removed strip of corn plasters comes into contact with the gauze with the adhesived sides of the corn plasters contacting said gauze. The primary roller 40 acts to press the corn plasters against the gauze which is backed by the transverse bar 59. The corn plasters are thus transferred from the plates to the moving gauze and are pressed tightly against said gauze by means of the presser rolls 34 and 35. After passing through the rolls 34 and 35 the gauze is brought into the field of operation of the revolving knives 25 which act to cut the large band or strip of gauze 60 into a plurality of narrow strips of gauze between the longitudinal rows of corn plasters. It will thus be seen that a plurality of strips of gauze 63 are cut by the machine with each of said strips having a longitudinal row of properly spaced corn plasters disposed thereon. The corn plaster strips 63 then pass between the second set of presser rolls 18 and 21 which further act to press the corn plasters upon the gauze after which said individual strips pass onto and are rolled upon the revolving reel 10 between the end disks 11. The rolls of corn plasters may be wound to any desired diameter depending upon how many corn plasters are to be contained in each roll.

By referring to Figure 2 it will be noted that the reel 10 has thus wound thereon a plurality of rolls 64 of corn plasters, said rolls being positioned adjacent one another. When the diameters of the rolls 64 are of the required size, the gauze strips 63 may be cut transversely, thereby permitting the winding up reel 10 to be removed from the machine to permit removal of the individual rolls 64. The rolls 64 are in stacks and may then be placed in large or small cartons ready for storage or shipment. If desired the individual rolls 64 may be separated and placed in small packages or boxes for sale purposes.

It will thus be seen that the machine is adapted to automatically remove rows of corn plasters from plates, transfer the plasters onto a moving band of gauze, after which the corn plasters are pressed into position to adhere to the gauze, after which the gauze is cut into a plurality of longitudinal strips and the individual strips simultaneously wound upon a receiving drum or reel.

I am aware that many changes may be made and numerous details of construction may be varied through a wide range without departing from the principles of this invention, and I therefore do not purpose limiting the patent granted hereon, otherwise than necessitated by the prior art, and while I have herein referred to the disclosure as a machine or system for making corn plasters and for the purpose of clear claim drafting I have used the same expressions in the claims, I wish it to be distinctly understood that I have used these words in a descriptive sense only, and not as words of limitation, as it is manifest that I am entitled to exclusive appropriation of any use for which the aforesaid machine, system or mode of procedure is adapted.

I claim as my invention:

1. A corn plaster machine comprising a frame, presser rolls mounted thereon, a cutter positioned between said presser rolls, means for supplying a strip of gauze to said presser rolls, a corn plaster carrying plate movably mounted on said frame, a stripper mechanism, and means for operating said presser rolls, said cutter and said plate to permit the stripper device to strip the corn plasters from said plate and deliver the same onto said strip of gauze.

2. A corn plaster machine comprising a frame, a reel supported thereon and carrying a roll of gauze, a winding reel supported on said frame, a plurality of sets of presser rolls supported on said frame, a cutter drum, a plurality of spaced cutters supported thereon, a gauze guide bar supported on said frame, said gauze adapted to be trained around said guide bar and fed between said presser rolls into the field of operation of said cutters, a plate carrying a plurality of rows of corn plasters, a stripper for co-action with said plate, means for advancing the plate to cause the stripper to remove the corn plasters from said plate and deliver the same onto said strip of gauze, and driving mechanisms connected to operate said plate, said presser rolls, said cutter drum and said winding reel.

3. A corn plaster machine of the class described embracing means for advancing a corn plaster carrying plate, means for feeding a strip of gauze through the machine, a stripper mechanism for removing the corn plasters from said plate and delivering them to said strip of gauze, and mechanisms for cutting the strip of gauze into a plurality of strips after the corn plasters have been pressed in position on said gauze.

4. A corn plaster machine comprising a cutter drum, a plurality of cutters thereon, means for advancing a corn plaster carrying plate through the machine, a stripper, means for operating the same, said stripper adapted to remove rows of corn plasters from said plate as the plate advances, a plurality of presser rolls adapted to feed a strip of gauze through the machine, said presser rolls adapted to press the adhesived side of the removed corn plasters against said gauze as the gauze is cut into strips by said cutters, and a reel for winding up the strips of gauze with the corn plasters thereon.

5. A corn plaster machine of the class described comprising mechanisms for feeding a strip of gauze through the machine, means for advancing a corn plaster carrying plate through the machine, a stripper adapted to remove the corn plasters from said advancing plate, means for pressing the corn plasters onto said strip of gauze, and cutting means adapted to cut the strip of gauze into a plurality of strips.

6. A corn plaster machine of the class described comprising means for advancing a strip of gauze through the machine, a cutter, means for advancing corn plaster carrying plates through the machine, and mechanisms for stripping and delivering corn plasters from said plates to said strip of gauze before the strip of gauze is cut by said cutter.

7. A corn plaster machine comprising a cutter, a feed mechanism for advancing corn plaster carrying plates through the machine, means for advancing a strip of gauze into the field of operation of said cutter to cut said strip into a plurality of narrower strips, stripping means for removing corn plasters from said plates and delivering said corn plasters to said strip of gauze, and presser means for pressing the corn plasters into adhering relation on said gauze.

8. A corn plaster machine comprising means for advancing a strip of gauze through the machine, means for feeding a corn plaster carrying plate into the machine, a stripper adapted to strip the corn plasters from said advancing plate and deliver the same onto said strip of gauze with the adhesived sides of said corn plasters coming into contact with the gauze, means for pressing the corn plasters onto the gauze, a cutter mechanism adapted to cut the strip of gauze into a plurality of narrow strips each carrying a row of corn plasters, and a winding reel for winding up the narrow strips of gauze.

9. A corn plaster machine comprising a frame, a cutter drum mounted thereon, presser rolls supported on said frame, mechanisms for driving said cutter drum and said presser rolls, a corn plaster carrying plate slidably supported on said frame, sprockets for advancing said plate, said sprockets adapted to be operated by said driving mechanisms, a gauze supply drum supported on the frame adapted to feed a strip of gauze to said presser rolls, a stripper positioned in the path of movement of said plate to strip corn plasters from said plate and deliver the same to said strip of gauze, and a winding drum adapted to receive the strip of gauze with the plasters secured thereto after said strip of gauze has been cut into strips by said cutter drum.

10. A corn plaster machine comprising a frame, a gauze drum reel supported thereon, a winding reel supported thereon, a cutter drum, presser rolls journalled on said frame, mechanisms for driving said winding reel, said cutter drum and said presser rolls, a guide roll also driven by said driving mechanism, a plurality of sprockets connected to be driven by said driving mechanism, a corn plaster carrying plate adapted to be engaged by said sprockets and advanced through the machine, and stripper means co-acting with said plate to strip the corn plasters therefrom and deliver the same to said gauze as it is advancing to be cut by said cutter drum before winding on the winding reel.

11. A corn plaster machine comprising a frame, a gauze carrying reel supported thereon, a winding reel supported on the frame, a plurality of presser rolls supported on said frame, a cutter drum also supported on said frame, mechanisms for driving said presser rolls, said cutter drum and said winding reel, a guide bar around which the gauze from said gauze reel is adapted to be trained, a plurality of sprockets adapted to be operated by said driving mechanisms, a guide roll positioned transversely between the frame and said sprockets, an apertured plate for carrying rows of corn plasters, said plate adapted to be fed through the machine by said sprockets, a stripper mechanism adapted to co-act with said plate to strip the corn plasters therefrom, and a primary roll operated by said driving mechanisms to feed the stripped corn plasters onto said gauze before said gauze is advanced into the field of operation of said cutter drum to be cut into strips for winding on said winding reel.

12. A corn plaster machine of the class described comprising means for advancing a strip of gauze through the machine, a cutter disposed in the path of movement of said gauze to cut said gauze into strips, a corn plaster carrying plate, means for advancing the same into the machine, a stripper device for removing the corn plasters from said advancing plate, and presser rolls for feeding the corn plasters onto said gauze and pressing the same into adhering relation therewith before the gauze is cut by said cutter drum.

13. A corn plaster machine comprising a plurality of corn plaster carrying plates, a feed mechanism for advancing said plates through the machine, means for feeding a strip of gauze through the machine, stripping mechanisms for delivering corn plasters from said plates onto said strip of gauze in rows, and means for cutting the strip of gauze into a plurality of individual strips each containing a row of said corn plasters.

14. A corn plaster machine comprising means for advancing a strip of gauze through the machine, mechanisms for feeding corn plaster carrying plates through the machine, a cutter for cutting said strip of gauze into a plurality of narrow strips, and means for stripping and then delivering and pressing corn plasters from said plates onto said strips of gauze prior to the cutting thereof.

15. A machine of the class described comprising a frame, guide rails thereon, an apertured plate supported on said guide rails, said plate adapted to carry a plurality of rows of corn plasters, means for feeding a strip of gauze through the machine, means for moving said plate through the machine, and mechanisms for stripping the corn plasters from said plate and transferring the same onto said moving gauze.

16. A machine of the class described comprising mechanisms for feeding a strip of gauze through the machine, an apertured plate slidable in the machine and adapted to carry a plurality of rows of corn plasters, means co-acting with said apertured plate to advance the same towards said moving gauze, a stripper means for removing the corn plasters from said plate, and means for delivering the removed corn plasters onto said gauze and pressing the same into adhering relation therewith.

17. A machine of the class described comprising means for feeding a strip of gauze into the machine, a corn plaster carrying plate, means for advancing the same through the machine, mechanisms for removing corn plasters from the plate and then sticking said corn plasters on said gauze, means for cutting the gauze into a plurality of narrow strips, and means for winding said narrow strips into rolls.

18. A machine of the class described comprising mechanisms for advancing a strip of gauze through the machine, corn plaster carrying plates, means co-acting with said plates for advancing the same toward the moving strip of gauze, stripper means for removing corn plasters from said plates and delivering the same to said gauze, cutter means for cutting the strip of gauze into a plurality of narrow strips each containing a row of corn plasters, and a reel adapted to simultaneously wind up said narrow strips of gauze to form a plurality of adjacently disposed corn plaster carrying rolls.

19. A machine comprising means for advancing a strip of gauze through the machine, corn plaster carrying plates, means coacting therewith for advancing the plates toward the strip of gauze, a pivotally mounted stripper for removing corn plasters from said advancing plates, a lever mechanism for controlling said stripper, means for delivering and pressing the corn plasters into engagement with said moving strip of gauze, means for cutting the strip of gauze into a plurality of narrow strips, and a mechanism for simultaneously winding up said narrow strips to form a plurality of rolls of corn plasters.

20. A machine of the class described comprising a gauze carrying reel, presser rolls for delivering the gauze from said reel and advancing the same through the machine, a slidable plate for carrying corn plasters, means for advancing the plate toward the moving strip of gauze, a stripper for stripping the corn plasters from said plate and transferring the same onto said moving strip of gauze, rotatable means for cutting said strip of gauze into plurality of narrower strips, and means for simultaneously winding up said narrow strips to afford a plurality of adjacently disposed individual corn plaster rolls.

In testimony whereof I have hereunto subscribed my name.

OTTO G. SCHMITT.